(12) United States Patent
Matsuyama et al.

(10) Patent No.: US 10,612,470 B2
(45) Date of Patent: Apr. 7, 2020

(54) FUEL INJECTION DEVICE

(71) Applicant: KAWASAKI JUKOGYO KABUSHIKI KAISHA, Kobe-shi, Hyogo (JP)

(72) Inventors: Ryusuke Matsuyama, Osaka (JP); Takeo Nishiura, Kobe (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 2 days.

(21) Appl. No.: 16/012,028

(22) Filed: Jun. 19, 2018

(65) Prior Publication Data

US 2018/0298824 A1    Oct. 18, 2018

Related U.S. Application Data

(63) Continuation of application No. PCT/JP2016/088259, filed on Dec. 22, 2016.

(30) Foreign Application Priority Data

Dec. 22, 2015  (JP) ................. 2015-250354

(51) Int. Cl.
*F02C 7/22* (2006.01)
*F23R 3/10* (2006.01)
(Continued)

(52) U.S. Cl.
CPC ............... *F02C 7/22* (2013.01); *F23D 11/38* (2013.01); *F23R 3/10* (2013.01); *F23R 3/14* (2013.01);
(Continued)

(58) Field of Classification Search
CPC ........ F02C 7/22; F23D 11/38; F23D 2214/00; F23D 2202/00; F23R 3/343; F23R 3/14; F23R 3/286; F23R 3/28; F23R 3/10
See application file for complete search history.

(56) References Cited

U.S. PATENT DOCUMENTS 4,763,481 A    8/1988  Cannon
6,339,923 B1   1/2002  Halila et al.
(Continued)

FOREIGN PATENT DOCUMENTS

DE    102007062896 A1    7/2008
EP        1793169 A2     6/2007
(Continued)

OTHER PUBLICATIONS

International Search Report for PCT/JP2016/088259 dated Mar. 21, 2017 [PCT/ISA/210].

*Primary Examiner* — Xiao En Mo
(74) *Attorney, Agent, or Firm* — Sughrue Mion, PLLC

(57) ABSTRACT

A fuel injection device for injecting an air-fuel mixture to a combustion chamber in a combustor of a gas turbine engine includes a fuel injector which is arranged on an axis of the fuel injection device. The fuel injector includes a fuel injection portion for injecting fuel in the radial direction of the fuel injection device, a fuel flow path portion forming a passage through which fuel is supplied to the fuel injection portion, and a heat shield cover that covers an end portion facing toward the combustion chamber side of the fuel injection portion such that an air layer is formed between the heat shield cover and the end portion.

7 Claims, 4 Drawing Sheets

(51) Int. Cl.
  *F23R 3/28* (2006.01)
  *F23R 3/14* (2006.01)
  *F23D 11/38* (2006.01)
  *F23R 3/34* (2006.01)

(52) U.S. Cl.
  CPC .............. *F23R 3/28* (2013.01); *F23R 3/286* (2013.01); *F23R 3/343* (2013.01); *F23D 2202/00* (2013.01); *F23D 2214/00* (2013.01)

(56) References Cited

U.S. PATENT DOCUMENTS

| | | | |
|---|---|---|---|
| 6,357,237 | B1 | 3/2002 | Candy et al. |
| 6,530,223 | B1 | 3/2003 | Dodds et al. |
| 6,547,163 | B1 * | 4/2003 | Mansour .............. B05B 1/3405 239/404 |
| 7,464,553 | B2 | 12/2008 | Hsieh et al. |
| 7,921,650 | B2 | 4/2011 | Oda et al. |
| 8,225,612 | B2 | 7/2012 | Oda et al. |
| 8,935,911 | B2 | 1/2015 | Nonaka et al. |
| 2007/0289305 | A1 | 12/2007 | Oda et al. |
| 2010/0251719 | A1 | 10/2010 | Mancini et al. |
| 2010/0269506 | A1 * | 10/2010 | Nonaka ............ F23D 11/386 60/742 |
| 2011/0016868 | A1 | 1/2011 | Oda et al. |
| 2015/0047361 | A1 | 2/2015 | Williams et al. |

FOREIGN PATENT DOCUMENTS

| | | |
|---|---|---|
| JP | 62-029834 A | 2/1987 |
| JP | 2002527708 A | 8/2002 |
| JP | 2007-162998 A | 6/2007 |
| JP | 2010-255944 A | 11/2010 |
| JP | 2013-178035 A | 9/2013 |
| JP | 2015-535583 A | 12/2015 |
| WO | 0022347 A1 | 4/2000 |
| WO | 0025067 A2 | 5/2000 |
| WO | 2009126483 A2 | 10/2009 |
| WO | 2015147935 A1 | 10/2015 |
| WO | 2015/182727 A1 | 12/2015 |

* cited by examiner

FUEL INJECTION DEVICE

CROSS REFERENCE TO THE RELATED APPLICATION

This application is a continuation application, under 35 U.S.C. § 111(a), of international application No. PCT/JP2016/088259, filed Dec. 22, 2016, which claims priority to Japanese Patent Application No. 2015-250354, filed Dec. 22, 2015, the disclosure of which are incorporated by reference in their entirety into this application.

BACKGROUND OF THE INVENTION

Field of the Invention

The present invention relates to a fuel injection device used in a combustor of a gas turbine engine.

Description of Related Art

Conventionally, various types have been proposed for fuel injectors used for aircraft gas turbine combustors. As one type thereof, a fuel injector of a plane jet type that injects fuel in the radial direction is known (e.g., see Patent Document 1). The fuel injector of this type has a merit that the structure thereof can be simplified.

RELATED DOCUMENT

Patent Document

[Patent Document 1]: JP Laid-open Patent Publication No. 2007-162998

SUMMARY OF THE INVENTION

However, fuel for use in a combustor is sometimes coked when being subjected to a high temperature. Coking tends to be particularly likely to occur at a portion, close to a combustion chamber, of a fuel injector. The same applies to a pilot fuel injector of a plane jet type.

The present invention has been made in view of the above-described circumstances, and an object of the present invention is to provide a fuel injection device which includes a fuel injector of a plane jet type and in which coking in the fuel injector is effectively prevented.

In order to attain the above-described object, a fuel injection device according to the present invention is a fuel injection device for injecting an air-fuel mixture to a combustion chamber in a combustor of a gas turbine engine, the fuel injection device including a fuel injector arranged on an axis of the fuel injection device having a cylindrical outer wall. The fuel injector includes: a fuel injection portion configured to inject fuel in a radial direction of the fuel injection device; a fuel flow path portion forming a passage configured to supply fuel therethrough to the fuel injection portion, and a heat shield cover that covers an end portion facing toward the combustion chamber side of the fuel injection portion such that an air layer is formed between the heat shield cover and the end portion.

The term "radial direction" of the above-described phrase "inject fuel in a radial direction" means the radial direction in a plan view along a plane orthogonal to the axis of the fuel injection device, and a case of injecting fuel in a direction that is tilted in the axis direction is also included.

According to this configuration, the portion, of the fuel injection portion, which is on the combustion chamber side and which is subjected to a particularly high temperature in the fuel injector is shielded from heat by the heat shield cover, and is insulated from heat by the air layer formed between the heat shield cover and the fuel injection portion. Thus, by the simple structure, increase in the temperature of the fuel injection portion is very effectively suppressed, and fuel is prevented from being coked.

In one embodiment of the present invention, the heat shield cover may include a cover support portion supporting the heat shield cover with respect to the fuel flow path portion, the cover support portion may be joined to the fuel flow path portion on an upstream side relative to the fuel injection portion, and the fuel flow path portion and the cover support portion may define therebetween a radial gap on a downstream side relative to a joining portion between the fuel flow path portion and the cover support portion. According to this configuration, by locating the contact point between the heat shield cover and the fuel flow path portion on the upstream side spaced apart from the combustion chamber side, heat input to the fuel flow path portion is suppressed. In addition, owing to the heat insulation effect of air that exists in the gap between the fuel flow path portion and the heat shield cover, heat input to the fuel flow path portion is suppressed.

In one embodiment of the present invention, the fuel injection device may further include a fuel introduction pipe forming a passage configured to introduce fuel therethrough to the fuel flow path portion; and a fuel passage cover that covers the fuel introduction pipe, in which a portion of the cover support portion that includes at least the joining portion is fitted to an inner wall surface of the fuel passage cover. According to this configuration, since the portion, of the cover support portion of the heat shield cover, that enters into the fuel passage cover does not come into direct contact with high-temperature air, heat input to the fuel flow path portion is further effectively suppressed. In addition, since the joining portion between the cover support portion and the fuel flow path portion is restrained in the radial direction by the fuel passage cover, vibrational stress that is generated at the joining portion can be suppressed.

In one embodiment of the present invention, an annular protrusion may be provided on an outer circumferential surface of a portion of the fuel flow path portion that defines the radial gap, and the annular protrusion may be in contact with an inner circumferential surface of the cover support portion. According to this configuration, since the relative vibration between the fuel flow path portion and the cover support portion is suppressed by providing the annular protrusion, vibrational stress that is generated at the joining portion can be effectively suppressed.

In one embodiment of the present invention, the fuel injection portion may include a fuel injection port provided so as to be flush with an outer circumferential surface of the heat shield cover or so as to protrude toward an outer diameter side beyond the outer circumferential surface. According to this configuration, fuel injected through the fuel injection ports is prevented from entering an inner space of the heat shield cover. As a result, the heat insulation effect can be prevented from being reduced by coked fuel being deposited in the heat shield cover.

In one embodiment of the present invention, the fuel injection device may further include a tubular wall that covers an outer circumference of the fuel injector and forms an air passage on an inner side of the tubular wall, in which the heat shield cover includes a cover portion that covers the end portion of the fuel injection portion facing toward the combustion chamber side, and has an outer surface of a shape substantially along an inner circumferential surface of the tubular wall. According to this configuration, the distance between the heat shield cover and the tubular wall forming the air passage, is set to be within an appropriate range, so that flow of air is ensured and a backfire phenomenon is prevented from occurring from the combustion chamber to the fuel injector.

In one embodiment of the present invention, the fuel injector may be a pilot fuel injector, and the fuel injection device may further include a main fuel injector encircling an outer circumference of the pilot fuel injector. According to this configuration, it becomes easy to optimally design the entire fuel injection device in which, for example, diffusion combustion and lean combustion are allocated to the pilot fuel injector and the main fuel injector thereby to achieve stable combustion and reduction in NOx, respectively, while coking in the pilot fuel injector is prevented.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
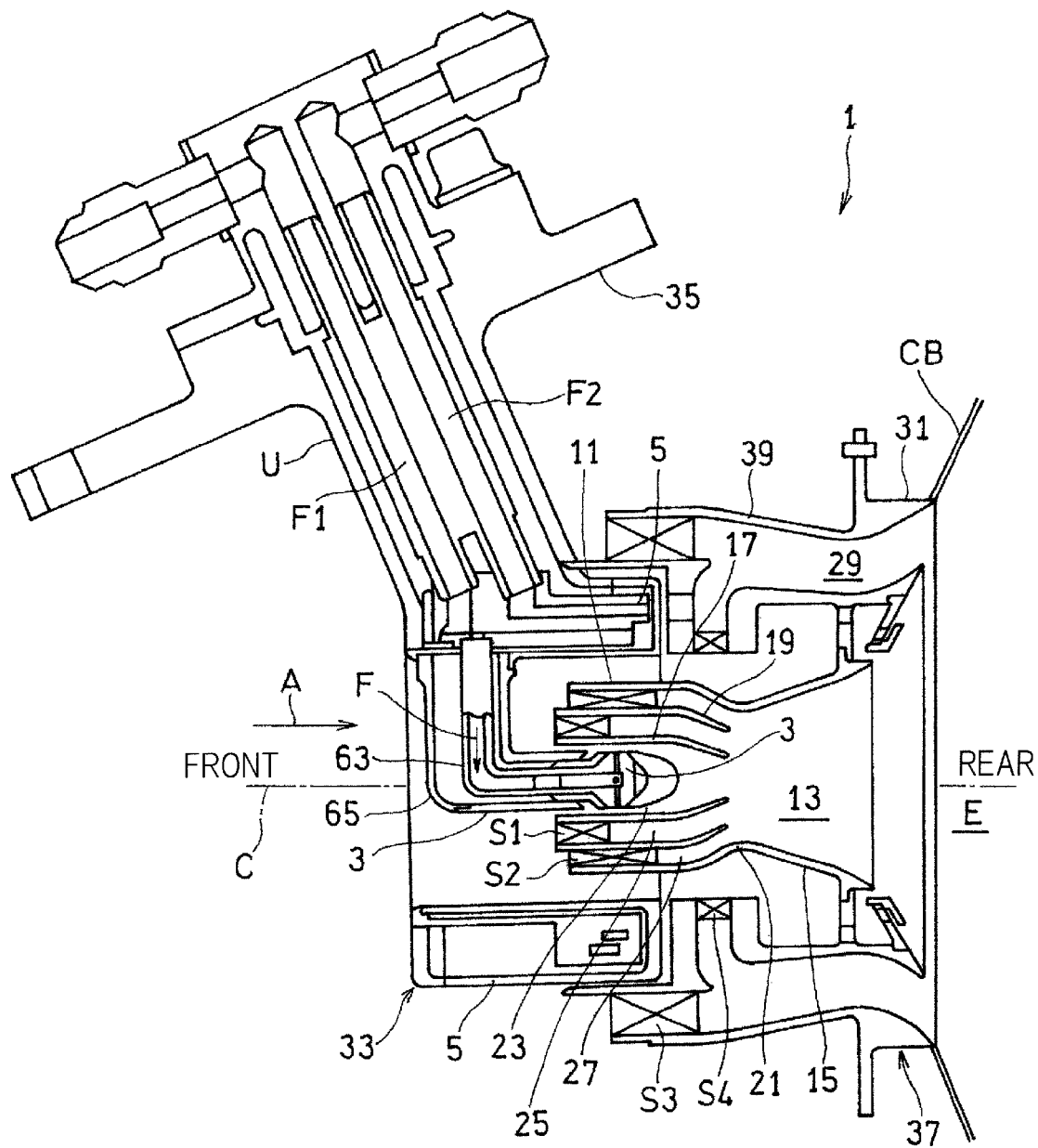
FIG. 1 is a vertical cross-sectional view showing a fuel injection device according to one embodiment of the present invention.

Hereinafter, an embodiment of the present invention will be described with reference to the drawings. FIG. 1 shows a fuel injection device 1 according to one embodiment of the present invention. The fuel injection device 1 is a device that is used in a combustor CB of a gas turbine engine for injecting, into a combustion chamber E of the combustor CB, a mixture of fuel F and compressed air A supplied from a compressor of the gas turbine engine. High-temperature and high-pressure combustion gas generated by combustion of the mixture in the combustion chamber E is supplied to a turbine to thereby drive a turbine. The fuel injection device 1 according to the present embodiment may be used for, for example, an annular type combustor CB, and a plurality of the fuel injection devices 1 may be arranged at equal intervals concentrically with the engine rotation axis which is not shown.

In the following description, the combustion chamber E side in an axis C direction of the fuel injection device 1 is referred to as a rear side, and the side opposite thereto is referred to as a front side. The front side and the rear side respectively correspond to an upstream side and a downstream side, in the fuel injection device 1, of the compressed air A supplied from the compressor. In addition, unless otherwise specified, the terms "inner side" and "outer side" respectively mean an "inner side" and an "outer side" in the radial direction of the fuel injection device 1.

The fuel injection device 1 includes: a pilot fuel injector 3 which is a fuel injector arranged on the axis C of the fuel injection device 1; and a main fuel injector 5 provided concentrically with the pilot fuel injector 3 so as to encircle an outer circumference of the pilot fuel injector 3.

An air supply unit 11, which supplies the compressed air A to the fuel F for diffusion combustion injected from the pilot fuel injector 3, is provided at a radially outer side relative to the pilot fuel injector 3. The air supply unit 11 has a tubular wall and an air passage. A pilot nozzle 15 having a tapered inner circumferential surface is provided on the downstream side of the air supply unit 11. The pilot nozzle 15 is formed in such a tapered shape that a diameter of the inner circumferential surface thereof increases toward the combustion chamber E side. The pilot nozzle 15 forms a pilot flow path 13 through which the fuel F from the pilot fuel injector 3 and the compressed air A from the air supply unit 11 are mixed with each other to be injected into the combustion chamber E.

As the tubular wall, at least one tubular wall is arranged on the outer side relative to the pilot fuel injector 3. In the present embodiment, three tubular walls, that is, a first tubular wall 17, a second tubular wall 19, and a third tubular wall 21 are arranged from the inner side to the outer side in this order. The pilot fuel injector 3 is arranged in an inner space 23 of the innermost tubular wall (the first tubular wall 17 in this example). The pilot nozzle 15 is formed at an end portion on the downstream side of the outermost tubular wall of the air supply unit 11. In this example, the pilot nozzle 15 is formed at an end portion on the downstream side of the third tubular wall 21. However, the pilot nozzle 15 may be separately provided on a further outer side relative to the outermost tubular wall of the air supply unit 11.

A swirler for swirling the compressed air A about the axis C is provided at an upstream portion of the air supply unit 11. In the present embodiment, a pilot inner-side swirler S1 is provided between the first tubular wall 17 and the second tubular wall 19. A pilot outer-side swirler S2 is provided between the second tubular wall 19 and the third tubular wall 21. In a case where the installation configuration such as the number of the tubular walls is changed, the arrangement of the swirlers may be appropriately changed. In a case where only one tubular walls is provided, the swirler may be provided between the pilot fuel injector 3 and the tubular wall.

Flow paths formed downstream of the swirlers are configured as air passages. The air passage is a space for allowing the compressed air A to pass therethrough. In the present embodiment, a pilot first air passage 25 is formed downstream of the pilot inner-side swirler S1. A pilot second air passage 27 is formed downstream of the pilot outer-side swirler S2.

Figure 2:
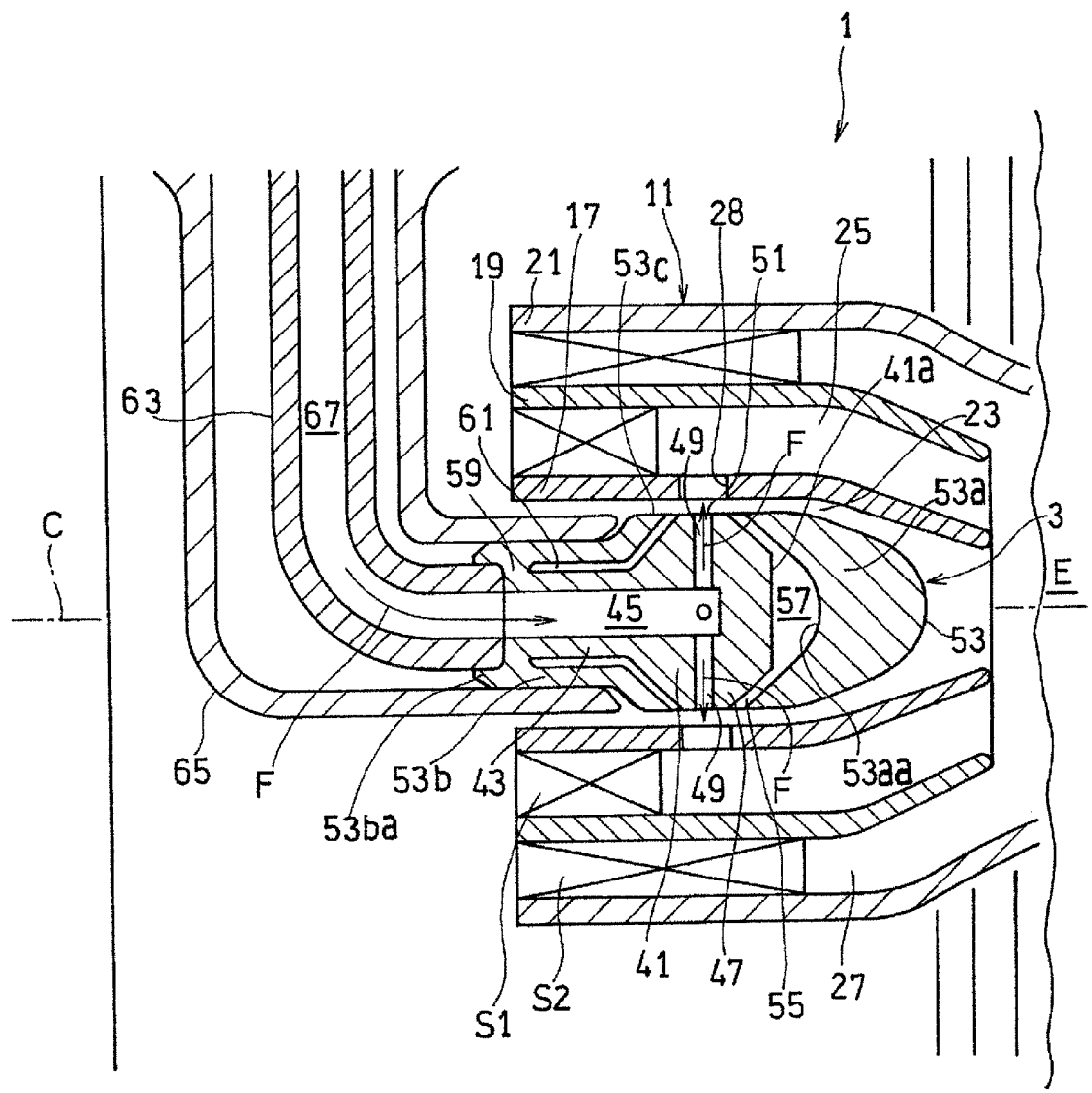
FIG. 2 is a vertical cross-sectional view showing a pilot fuel injector used for the fuel injection device in FIG. 1.

In the present embodiment, as shown in FIG. 2, the fuel F for diffusion combustion injected from the pilot fuel injector 3 passes through a fuel passing hole 28 formed in the innermost tubular wall (the first tubular wall 17 in this example), to flow into the pilot first air passage 25. The fuel passing hole 28 is formed as a hole penetrating the tubular wall in the radial direction. In the pilot first air passage 25, the fuel F is mixed with air A having passed through the pilot inner-side swirler S1. Thereafter, in the pilot flow path 13, the resultant mixture is mixed with air A having passed through the pilot outer-side swirler S2, so that the resultant mixture is supplied to the combustion chamber E.

Meanwhile, fuel for lean combustion injected from the main fuel injector 5 shown in FIG. 1 is pre-mixed, in a pre-mixed gas passage 29, with air having passed through swirlers S3, S4 for the main fuel injector, so that the resultant lean pre-mixed gas is supplied through a main nozzle 31 to the combustion chamber E.

The fuel injection device 1 includes an upstream-side structure 33 including the pilot fuel injector 3 and the main fuel injector 5. The upstream-side structure 33 is supported by a housing (not shown) of the combustor CB via a stem portion 35 which forms a fuel pipe unit U. The fuel pipe unit U includes; a first fuel introduction system F1 which introduces fuel to be supplied to the pilot fuel injector 3; and a second fuel introduction system F2 which introduces fuel to be supplied to the main fuel injector 5. The fuel injection device 1 also includes a downstream-side structure 37, which forms therein the pre-mixed gas passage 29 for the main fuel injector 5, and is supported by a combustion tube that forms the combustion chamber E via a support flange provided at a downstream-side end portion of a main outer-side shroud 39 which forms a cylindrical outer wall of the fuel injection device 1.

Hereinafter, the configuration of the pilot fuel injector 3 will be described in detail. As shown in FIG. 2, the pilot fuel injector 3 includes: a fuel injection portion (hereinafter, referred to as a "pilot fuel injection portion") 41 which injects the fuel F in the radial direction of the fuel injection device 1; and a fuel flow path portion (hereinafter, referred to as a "pilot fuel flow path portion") 43 which forms a passage for supplying fuel therethrough to the pilot fuel injection portion 41. In other words, the pilot fuel injector 3 is a so-called plane-jet-type fuel injector.

Figure 3:
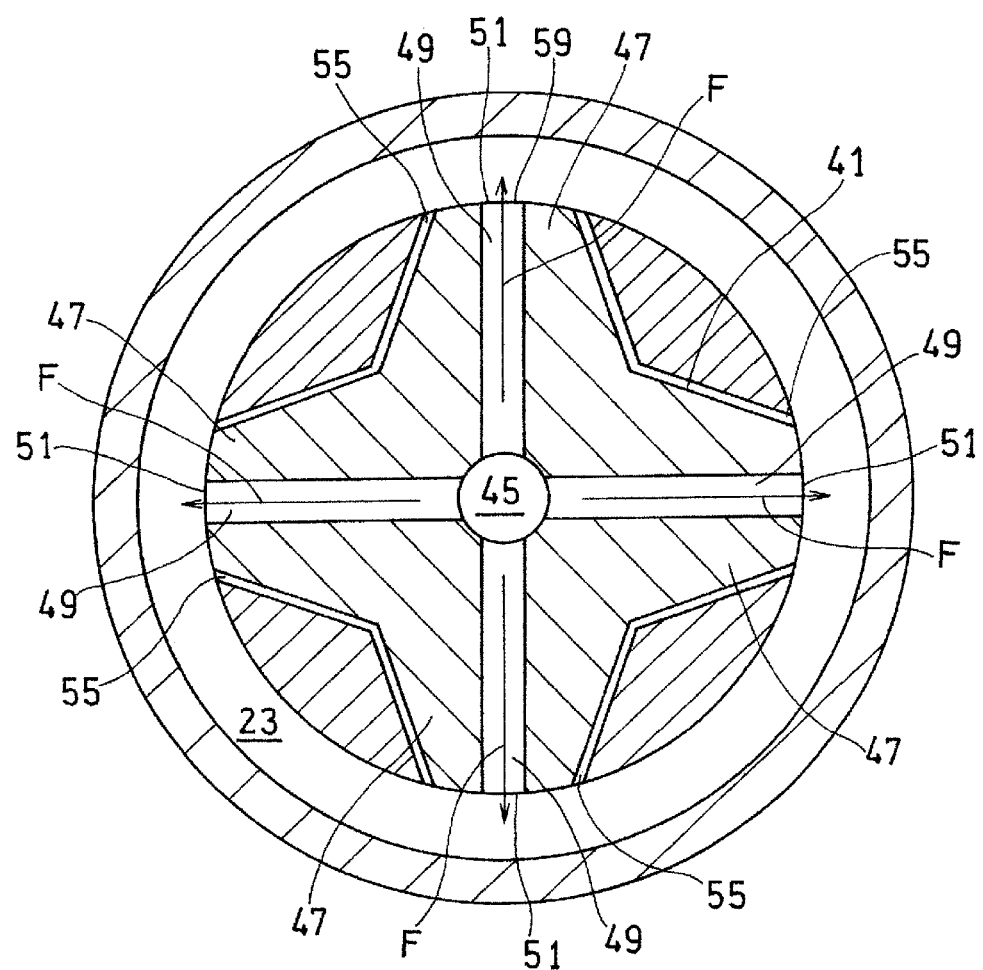
FIG. 3 is a horizontal cross-sectional view showing a pilot fuel injection portion of the pilot fuel injector in FIG. 2.

The pilot fuel flow path portion 43 is formed of a tubular member connected to the front side of the pilot fuel injection portion 41, and a hollow portion of the pilot fuel flow path portion 43 forms a pilot fuel flow path 45. The pilot fuel injection portion 41 is provided at a downstream end of the pilot fuel flow path portion 43. The pilot fuel injection portion 41 includes a plurality (four in the present embodiment) of fuel injection nozzles 47 protruding toward a radially outer side relative to the pilot fuel flow path portion 43. As shown in FIG. 3, nozzle the fuel flow paths 49 which are holes extending in the radial direction in a radial pattern are provided in the respective fuel injection nozzles 47. The fuel F is injected through fuel injection ports 51 which are ports opening toward the outer side of the respective nozzle the fuel flow paths 49. In the present embodiment, as shown in FIG. 2, the pilot fuel injection portion 41 and the pilot fuel flow path portion 43 are formed as a single member.

Figure 4:
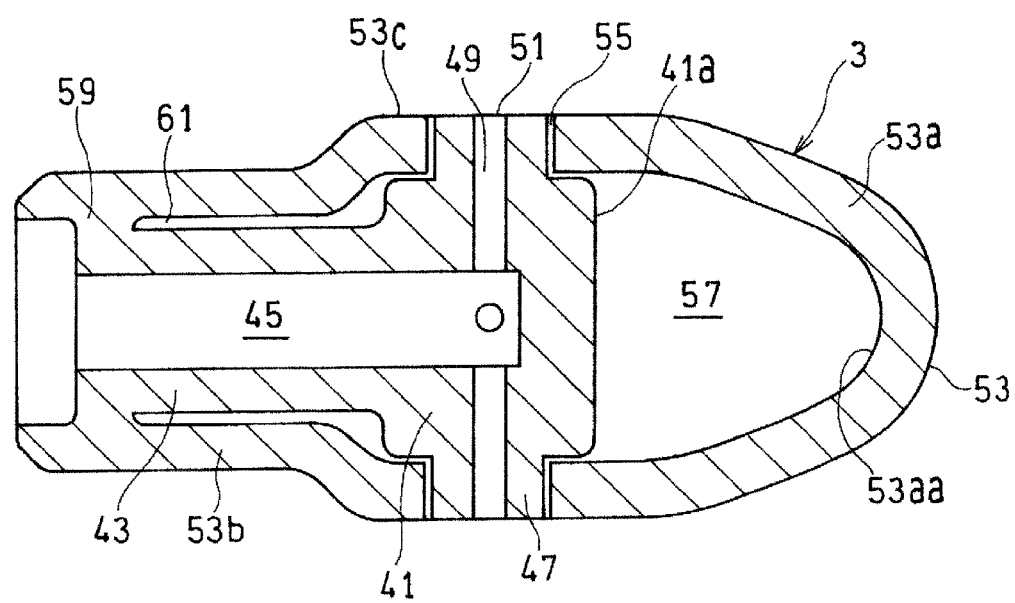
FIG. 4 is a vertical cross-sectional view showing one modification of the pilot fuel injector in FIG. 2.

In the present embodiment, each of the fuel injection nozzles 47 of the pilot fuel injection portion 41 is formed in a truncated cone shape. However, the shape of the fuel injection nozzle 47 is not limited to the shown example, but may be any shape such as a columnar shape, a conical shape, or a cubic shape. FIG. 4 shows, as a modification of the present embodiment, an example where the fuel injection nozzle 47 of the pilot fuel injection portion 41 has a columnar shape.

In the present embodiment, as shown in FIG. 2, each of the nozzle the fuel flow paths 49 of the pilot fuel injection portion 41 is formed so as to extend along the radial direction. The nozzle the fuel flow path 49 extends in the radial direction in a plan view along a plane orthogonal to the axis, and may be tilted or curved in the axis C direction.

As shown in FIG. 2, the pilot fuel injector 3 further includes a heat shield cover 53. The heat shield cover 53 covers a portion (hereinafter, simply referred to as a "combustion-chamber-side portion") 41a, which faces toward the combustion chamber E side, of the pilot fuel injection portion 41. More specifically, the heat shield cover 53 includes: a cover portion 53a that covers the combustion-chamber-side portion 41a of the pilot fuel injection portion 41; and a cover support portion 53b that supports the heat shield cover 53 with respect to the pilot fuel flow path portion 43. Nozzle window holes 55 opening toward the outer side are formed at portions of the heat shield cover 53 that correspond to respective fuel injection ports 51. A portion of the heat shield cover 53 on the rear side relative to the nozzle window holes 55 forms the cover portion 53a, and a portion of the heat shield cover 53 on the front side relative to the nozzle window holes 55 forms the cover support portion 53b.

The heat shield cover 53 covers the pilot fuel injection portion 41 such that an air layer 57 is formed between the heat shield cover 53 and the combustion-chamber-side portion 41a. In the shown example, a radially central portion of the combustion-chamber-side portion 41a of the pilot fuel injection portion 41 is formed in the shape of a plane orthogonal to the axis C. On the other hand, an inner wall surface 53aa of the cover portion 53a of the heat shield cover 53 is formed in the shape of curved surface bulging toward the rear side. The air layer 57 is formed between the radially central portion of the combustion-chamber-side portion 41a of the pilot fuel injection portion 41 and the inner wall surface 53aa of the cover portion 53a. As long as the shape of the inner wall surface 53aa of the cover portion 53a is such a shape that the air layer can be formed between the inner wall surface 53aa and the combustion-chamber-side portion 41a of the pilot fuel injection portion 41, the shape of the inner wall surface 53aa is not limited to the above-described example, but may be any shape such as a conical shape or a truncated cone shape.

If the distance from the pilot fuel injection portion 41 to the cover portion 53a of the heat shield cover 53 is too short, the heat insulation effect of the air layer 57 is insufficient. From this point of view, the distance between the pilot fuel injection portion 41 and the cover portion 53a, which is the thickness of the air layer 57, that is, more specifically, the distance between the position, on the axis C, of the combustion-chamber-side portion 41a of the pilot fuel injection portion 41 and the position, on the axis C, of the inner wall surface 53aa of the cover portion 53a, is determined.

The air layer 57 communicates with an outer space via only gaps between the fuel injection nozzles 47 and the nozzle window holes 55 of the heat shield cover 53. However, each of the gaps between the fuel injection nozzles 47 and the nozzle window holes 55 of the heat shield cover 53 is so small that air does not flow in or out between the outer space and the air layer 57 in a state where air A flows in the pilot first air passage 25, and therefore the air layer 57 is formed as a substantially closed space.

The cover support portion 53b of the heat shield cover 53 is joined to the pilot fuel flow path portion 43 on the upstream side relative to the pilot fuel injection portion 41. In the present embodiment, the cover support portion 53b of the heat shield cover 53 is joined to an end portion on the most upstream side of the pilot fuel flow path portion 43. In the present embodiment, although the cover support portion 53b of the heat shield cover 53 is formed as a single member integrated with the pilot fuel flow path portion 43, the pilot fuel flow path portion 43 and the cover support portion 53b (i.e., heat shield cover 53) may be separately formed and joined to each other by, for example, welding. The pilot fuel flow path portion 43 and the cover support portion 53b define a radial gap 61 therebetween on the downstream side relative to a joining portion 59 between the pilot fuel flow path portion 43 and the cover support portion 53b.

Since the contact point between the heat shield cover 53 and the pilot fuel flow path portion 43 is located on the upstream side spaced apart from the combustion chamber E side, heat input to the pilot fuel flow path portion 43 is suppressed. In addition, by air that exists in the gap 61 between the pilot fuel flow path portion 43 and the heat shield cover 53, heat input to the pilot fuel flow path portion 43 is suppressed.

In the shown example, on the downstream side relative to the joining portion 59, a gap is formed between the heat shield cover 53, and the pilot fuel injection portion 41 and the pilot fuel flow path portion 43. Accordingly, the pilot fuel injection portion 41 and the pilot fuel flow path portion 43 are spaced apart from the heat shield cover 53. In other words, on the downstream side relative to the joining portion 59, there is no portion at which the pilot fuel injection portion 41 and the pilot fuel flow path portion 43 are in contact with the heat shield cover 53. With such a configuration, heat input to the fuel F flowing from the pilot fuel flow path portion 43 to the pilot fuel injection portion 41 is further suppressed.

The fuel injection device 1 further includes: a fuel introduction pipe (hereinafter, referred to as a "pilot fuel introduction pipe") 63 forming a passage for introducing the fuel F therethrough to the pilot fuel flow path portion 43; and a fuel passage cover (hereinafter, referred to as a "pilot fuel passage cover") 65 that covers the pilot fuel introduction pipe 63. As shown in FIG. 1, the pilot fuel introduction pipe 63 is formed by an L-shaped tubular member that extends in the radial direction from an inner circumferential wall of the housing of the main fuel injector 5 to a position on the axis C of the fuel injection device 1, and, from this position, further bends and extends in the axis C direction. A downstream end portion of the pilot fuel introduction pipe 63 is connected to the pilot fuel flow path portion 43. In the example shown in FIG. 2, an upstream end portion of the cover support portion 53b extends toward a further upstream side relative to the joining portion 59 between the cover support portion 53b and the pilot fuel flow path portion 43, and the downstream end portion of the pilot fuel introduction pipe 63 is connected to this extending portion 53ba so that the downstream end portion of the pilot fuel introduction pipe 63 is connected to the pilot fuel flow path portion 43. A pilot fuel introduction passage 67 formed as a hollow portion of the pilot fuel introduction pipe 63 for the pilot fuel injector 3 is connected to the first fuel introduction system F1 in FIG. 1 through a connection path formed in the housing of the main fuel injector 5, whereby the fuel from the first fuel introduction system F1 is introduced to the pilot fuel flow path portion 43.

In the shown example, the pilot fuel injector 3 and the pilot fuel introduction pipe 63 are formed separately from each other, and are connected to each other by the downstream end portion of the pilot fuel introduction pipe 63 being fitted to the extending portion 53ba. However, the configuration in which the pilot fuel injector 3 and the pilot fuel introduction pipe 63 are connected to each other, is not limited to this example. The pilot fuel introduction pipe 63 may be formed so as to be integrated with the pilot fuel injector 3 (the pilot fuel flow path portion 43 and the cover support portion 53b of the pilot fuel injector 3 in the shown example).

As shown in FIG. 2, the pilot fuel passage cover 65 is formed by an L-shaped tubular member substantially along the pilot fuel introduction pipe 63. One end of the pilot fuel passage cover 65 is connected to and supported by the inner circumferential wall of the housing of the main fuel injector 5 (FIG. 1). The other end of the pilot fuel passage cover 65 is slidably fitted to an outer circumferential surface of the pilot fuel flow path portion 43. In other words, a portion, of the cover support portion 53b, that includes the joining portion 59 is fitted to an inner circumferential surface of the pilot fuel passage cover 65. Accordingly, the pilot fuel injector 3 is mounted to the pilot fuel passage cover 65 so as to be slidable in the axis C direction. In addition, the pilot fuel passage cover 65 covers also a portion of the pilot fuel flow path portion 43.

According to this configuration, since the portion, of the cover support portion 53b of the heat shield cover 53, that enters into the pilot fuel passage cover 65 does not come into direct contact with high-temperature air, heat input to the pilot fuel flow path portion 43 is effectively suppressed. In addition, since the joining portion 59 between the cover support portion 53b and the pilot fuel flow path portion 43 is restrained in the radial direction by the pilot fuel passage cover 65, vibrational stress which is generated at the joining portion 59 can be suppressed. Moreover, since the pilot fuel injector 3 is mounted to the pilot fuel passage cover 65 so as to be slidable in the axis C direction, the difference in thermal expansion between the pilot fuel injector 3 and the pilot fuel passage cover 65 can be absorbed.

Figure 5:
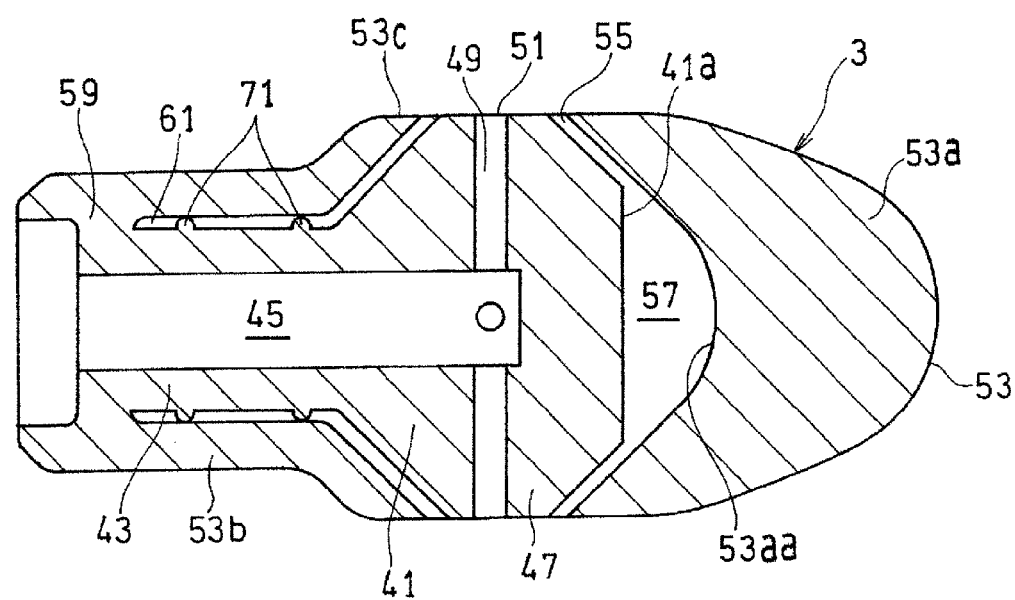
FIG. 5 is a vertical cross-sectional view showing another modification of the pilot fuel injector in FIG. 2.

As shown in FIG. 5 as a modification of the present embodiment, annular protrusions 71 may be provided on an outer circumferential surface of a portion, of the pilot fuel flow path portion 43, along which the gap 61 in the radial direction is formed. In the shown example, the annular protrusions 71 are in contact with an inner circumferential surface of the cover support portion 53b. Although two annular protrusions 71 are provided on the outer circumferential surface of the pilot fuel flow path portion 43, the number of the protrusions 71 may be one, or a plurality of (three or more) protrusions 71 may be provided. The annular protrusions 71 may be provided for any shapes of the fuel injection nozzles 47 in combination. In a case where the annular protrusions 71 are provided on the outer circumferential surface of the pilot fuel flow path portion 43 as described above, the relative vibration between the pilot fuel flow path portion 43 and the cover support portion 53b is suppressed, and thus, vibrational stress that is generated at the joining portion 59 can be effectively suppressed. The annular protrusions 71 do not need to be constantly in contact with the inner circumferential surface of the cover support portion 53b. For example, a configuration may be employed in which the annular protrusions 71 come into contact with the inner circumferential surface of the cover support portion 53b when the relative vibration between the pilot fuel flow path portion 43 and the cover support portion 53b reaches a predetermined magnitude. In addition, the annular protrusions 71 do not need to be provided so as to be circumferentially continuous, but may be provided so as to be circumferentially intermittent.

As shown in FIG. 2, the fuel injection ports 51 of the pilot fuel injection portion 41 are provided so as to be flush with an outer circumferential surface 53c of the heat shield cover 53. Although the positions at which the fuel injection ports 51 of the pilot fuel injection portion 41 are provided are not limited to the shown example, the fuel injection ports 51 are preferably provided so as to be flush with the outer circumferential surface (an outer circumferential surface in which the nozzle window holes 55 are formed) 53c of the heat shield cover 53 or so as to protrude toward an outer diameter side beyond the outer circumferential surface 53c. With this configuration, the fuel injected through the fuel injection ports 51 can be prevented from entering an inner space of the heat shield cover 53. As a result, the heat insulation effect can be prevented from being reduced by coked fuel being deposited in the heat shield cover 53.

An outer surface of the cover portion 53a, of the heat shield cover 53, which covers the combustion-chamber-side portion 41a of the pilot fuel injection portion 41 has a shape substantially along the shape of an inner circumferential surface of the inner-side tubular wall 17. More specifically, in the present embodiment, the inner-side tubular wall 17 has such a shape that a diameter of one end portion thereof gradually decreases toward the combustion chamber E side, and the outer surface of the cover portion 53a of the heat shield cover 53 has such a shape that a diameter thereof gradually decreases toward the combustion chamber E side, along the inner circumferential surface of the inner-side tubular wall 17. With this configuration, the distance between the heat shield cover 53 and the inner-side tubular wall 17 which is a tubular wall, is set to be within an appropriate range, so that flow of air A is ensured and a backfire phenomenon is prevented from occurring from the combustion chamber E to the pilot fuel injector 3.

As described above, in the fuel injection device 1 according to the present embodiment, the portion 41a, of the pilot fuel injection portion 41, which is on the combustion chamber E side and which is subjected to a particularly high temperature in the pilot fuel injector 3 is shielded from heat by the heat shield cover 53, and is insulated from heat by the air layer 57 formed between the heat shield cover 53 and the pilot fuel injection portion 41. Thus, by the simple structure, increase in the temperature of the pilot fuel injection portion 41 is very effectively suppressed, and fuel is prevented from being coked.

In the above-described embodiment, although the examples where the main fuel injector 5 is a fuel injector employing a lean combustion method are described, the combustion method employed by the main fuel injector 5 is not limited thereto.

In addition, in the above-described embodiment, as an example of the fuel injection device to which the present invention is applied, the fuel injection device is described which includes the pilot fuel injector 3 which is a so-called plane-jet-type fuel injector, and the main fuel injector 5 surrounding the same. With this configuration, it becomes easy to optimally design the entire fuel injection device by, for example, different combustion methods being allocated to the pilot fuel injector and the main fuel injector. However, the present invention is applicable also to a fuel injection device including only a plane-jet-type fuel injector having a structure similar to that of the pilot fuel injector 3. In this case, the tubular wall arranged at the outermost circumference forms the cylindrical outer wall of the fuel injection device.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Fuel injection device
3 . . . Pilot fuel injector (Fuel injector)
5 . . . Main fuel injector
17 . . . Inner-side tubular wall (Tubular wall)
39 . . . Main outer-side shroud (Cylindrical outer wall)
41 . . . Pilot fuel injection portion (Fuel injection portion)
41a . . . End portion of pilot fuel injection portion facing toward combustion chamber side
43 . . . Pilot fuel flow path portion (The fuel flow path portion)
51 . . . Fuel injection port
53 . . . Heat shield cover
53a . . . Cover portion
53b . . . Cover support portion
57 . . . Air layer
61 . . . Radial gap
63 . . . Pilot fuel introduction pipe (Fuel introduction pipe)
65 . . . Pilot fuel passage cover (Fuel passage cover)
CB . . . Combustor
E . . . Combustion chamber

What is claimed is:

1. A fuel injection device for injecting an air-fuel mixture to a combustion chamber in a combustor of a gas turbine engine, the fuel injection device comprising
a fuel injector arranged on an axis of the fuel injection device having a cylindrical outer wall,
the fuel injector including:
a fuel injection portion configured to inject fuel in a radial direction of the fuel injection device;
a fuel flow path portion forming a passage configured to supply fuel therethrough to the fuel injection portion, and
a heat shield cover that covers an end portion facing toward the combustion chamber side of the fuel injection portion such that an air layer is formed between the heat shield cover and the end portion, wherein
the heat shield cover includes a cover support portion that supports the heat shield cover with respect to the fuel flow path portion,
the cover support portion is joined to the fuel flow path portion on an upstream side relative to the fuel injection portion, and
the fuel flow path portion and the cover support portion defines therebetween a radial gap on a downstream side relative to a joining portion between the fuel flow path portion and the cover support portion.

2. The fuel injection device as claimed in claim 1, further comprising:
a fuel introduction pipe forming a passage configured to introduce fuel therethrough to the fuel flow path portion; and
a fuel passage cover that covers the fuel introduction pipe, wherein a portion of the cover support portion that includes at least the joining portion is fitted to an inner wall surface of the fuel passage cover.

3. The fuel injection device as claimed in claim 1, wherein an annular protrusion is provided on an outer circumferential surface of a portion of the fuel flow path portion that defines the radial gap, and the annular protrusion is in contact with an inner circumferential surface of the cover support portion.

4. The fuel injection device as claimed in claim 1, wherein the fuel injection portion includes a fuel injection port provided so as to be flush with an outer circumferential surface of the heat shield cover or so as to protrude toward an outer diameter side beyond the outer circumferential surface.

5. The fuel injection device as claimed in claim 1, further comprising a tubular wall that covers an outer circumference of the fuel injector and forms an air passage on an inner side of the tubular wall, wherein the heat shield cover includes a cover portion that covers the end portion of the fuel injection portion facing toward the combustion chamber side, and has an outer surface of a shape substantially along an inner circumferential surface of the tubular wall.

6. The fuel injection device as claimed in claim 5, wherein the tubular wall has such a shape that a diameter of one end portion thereof gradually decreases toward the combustion chamber side, and the outer surface of the cover portion of the heat shield cover has such a shape that a diameter thereof gradually decreases toward the combustion chamber side, along the inner circumferential surface of the tubular wall.

7. The fuel injection device as claimed in claim 1, wherein the fuel injector is a pilot fuel injector, the fuel injection device further comprising a main fuel injector that encircles an outer circumference of the pilot fuel injector.

* * * * *